United States Patent

[11] 3,587,072

[72] Inventors Shintaro Oshima; Toshihiko Kobayashi, Tokyo-to; Tetsusaburo Kamibayashi, Kitaadachi-gun, Saitama-ken, all of, Japan

[21] Appl. No. 786,264
[22] Filed Dec. 23, 1968
[45] Patented June 22, 1971
[73] Assignee Kokusal Denshin Denwa Kabuskiki Kaisha Tokyo-to, Japan
[32] Priority Dec. 28, 1967
[33] Japan
[31] 42/84,274

[54] SEQUENTIAL-ACCESS MEMORY OF HIGH DENSITY USING FERROMAGNETIC THIN FILMS
10 Claims, 9 Drawing Figs.

[52] U.S. Cl. .......... 340/174.1, 340/174, 346/135
[51] Int. Cl. .......... G11b 5/02, G01d 15/34, G11b 5/82
[50] Field of Search .......... 340/174 TF, 174.1 F; 174/100.2 CF, 100.2 C, 100.2 A, 100.2 CH; 346/74 MC, 135-8

[56] References Cited

UNITED STATES PATENTS 3,299,413 1/1967 Synder et al. .......... 340/174
3,354,447 11/1967 Oshimz .......... 340/174

*Primary Examiner*—Bernard Konick
*Assistant Examiner*—Vincent P. Canney
*Attorneys*—Robert E. Burns and Emmanuel J. Lobato

ABSTRACT: A sequential-access memory of the magnetic disc, drum or tape type by using at least one magnetic head scanning successive memory zones of a storage medium. The storage medium comprises at least one set of composite elongated conductive layers coated respectively with uniform ferromagnetic thin films and deposited side-by-side on the surface of a substratum made as a disc, drum or a tape. The easy magnetization axis of the ferromagnetic thin film is established substantially along planes perpendicular to the longitudinal direction of the elongated conductive layer, the uniform ferromagnetic thin films form a closed magnetic circuit around each of the composite elongated conductive layers. Information signals are stored in the storage medium by applying these information signals to the respective elongated conductive layers in applying a DC magnetic field to the storage medium by the magnetic head along the hard magnetization direction of the ferromagnetic thin films. The stored information signals are readout from the elongated conductive layers by applying a magnetic field to the storage medium with the magnetic head along the hard magnetization direction of the ferromagnetic thin films.

SEQUENTIAL-ACCESS MEMORY OF HIGH DENSITY USING FERROMAGNETIC THIN FILMS

This invention relates to a sequential-access memory and more particularly to sequential-access memories each having a plurality of memory tracks.

Magnetic drum memories, magnetic disc memories and magnetic tape memories and etc. have heretofore been proposed as sequential access memories. In the conventional sequential-access memory, a storage medium, for example a nonconductive drum, disc or tape on which a ferromagnetic layer is deposited is employed. In storing information signals in successive memory zones of the storage medium, this storage medium is driven so as to rotate or travel and the information signals are applied, together with a high frequency bias current if necessary, to a magnetic head arranged closely to the surface of the storage medium. The stored information signals are readout from the magnetic head by utilizing the change of magnetic fluxes interlinked with the magnetic head, since the magnetic fluxes change in accordance with the magnetization states of successive memory zones of the storage medium in the rotating or travelling storage medium.

In a sequential-access memory having a plurality of parallel tracks, a magnetic head is provided for each of the tracks, and a particular one of the tracks is employed as a synchronous track in which a synchronous signal is stored to be used to store to and read from the remaining tracks the stored information signals. Accordingly, any of the successive memory zones of the parallel tracks can be identified by designating the address of the desired memory zone with reference to the synchronous signal.

However, since the storage medium is usually composed of magnetic powder, such as ferrite, applied on a nonmagnetic substratum in each of the conventional sequential-access memories, the storage medium doesn't have a uniform characteristic for each of the small memory zones. Moreover, the residual magnetic induction of each of the memory zones is directed in the longitudinal direction of the storage medium, and the storage medium does not form any closed magnetic circuit therein with respect to the residual magnetic induction. Accordingly, there is a limit to miniaturization of the memory zones of the storage medium due to the demagnetizing force caused in the storage medium. Furthermore, since the readout signal is obtained from the magnetic head picking up the change of density of the magnetic fluxes generated from the memory zones, the readout signal becomes smaller in proportion to the miniaturization of the memory zone. Accordingly, there is another limit to miniaturization of the memory zone of the conventional sequential access-memory due to the reduce of the output voltage.

However, the requirement of mass-memories is recently raised for large-scale electronic equipment such as electronic computers. In this case, a miniaturized memory of high memory capacity is required in view of the economy of such equipment and the reduction of access-time. Performance of these requirements is extremely difficult by use of conventional techniques.

An object of this invention is to provide a sequential-access memory of high density capable of realizing the above mentioned requirements by use of ferromagnetic thin films.

In the sequential-access memory of this invention, for attaining the above object, the storage medium comprises at least one set of elongated conductive layers coated respectively with uniform ferromagnetic thin films and arranged side-by-side on the surface of a nonmagnetic substratum. The easy magnetization axis of the ferromagnetic thin film is directed in a direction perpendicular to the longitudinal direction of the elongated conductive layer. At least one magnetic head is provided for each set of the storage mediums. In storing information in the storage mediums, a DC drive current is flowed in the magnetic head and information signals are applied respectively to the plurality of elongated conductive layers. The information signals may be digital signals or analogue signals. The magnetization states of the memory zones allocated successively in the elongated storage mediums therealong are directed either one or the other of opposite allowable directions in accordance with the polarities of the input information signals. In reading out the storage information, the DC drive current is again flowed in the magnetic head so that respective readout signals indicative of the magnetization states of the memory zones opposed to the magnetic head are successively derived from the elongated conductive layers. As a result of this construction and operation of the invention, the magnetic film of each of the storage mediums forms a closed magnetic circuit around the elongated conductive layer with respect to the residual magnetic induction of the information signal so that miniaturization of the memory zone can be attained. Moreover, sensitivity of the elongated conductive layer against the readout information signal is extremely high. Accordingly, a miniaturized sequential-access memory of high density can be effectively realized in accordance with this invention.

The principle of this invention will be better understood from the following detailed discussion taken in conjunction with the accompanying drawings, in which the same or equivalent parts are designated by the same reference numerals, characters and symbols, and in which.

Figure 1:
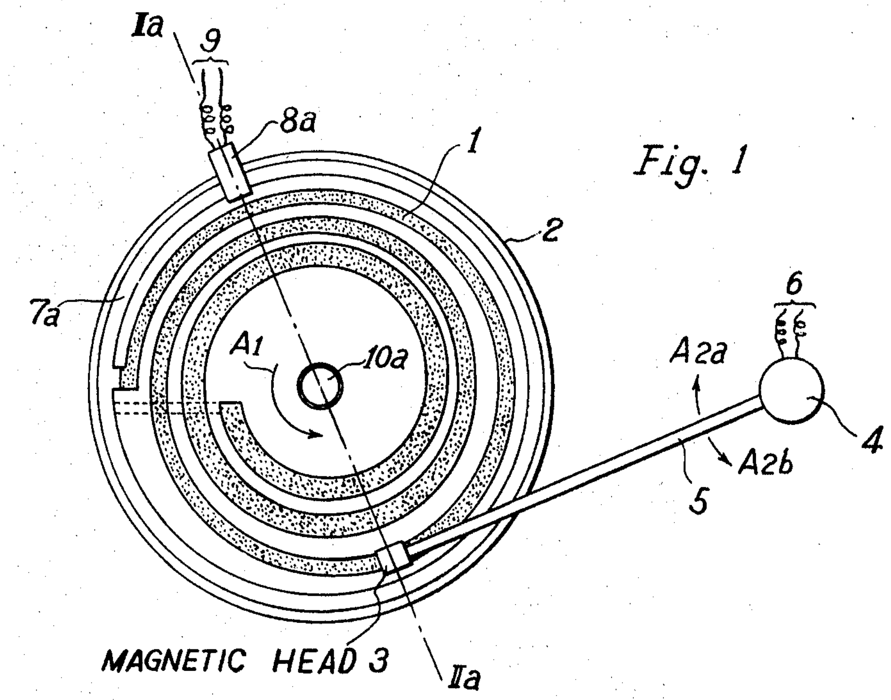
FIG. 1 is a plan view of a diagrammatic apparatus according to the principle of this invention.
Figure 2A:
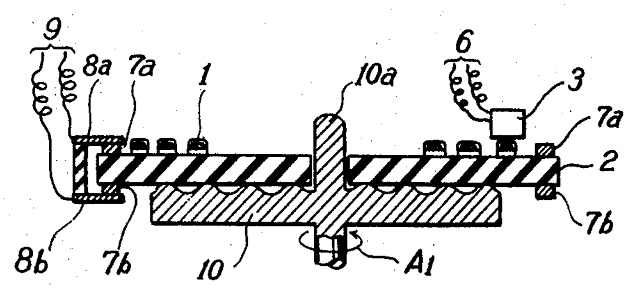
FIG. 2A is a sectional view along a section line IIa–IIa in FIG. 1.
Figure 2B:
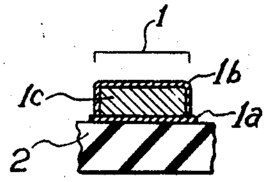
FIG. 2B is a fragmentary sectional view for describing the construction of the storage medium employed in this invention.

With reference to FIGS. 1, 2A and 2B, the principle of this invention will first be described. FIGS. 1 and 2A show an apparatus constructed according to a principle of this invention applied to form a sequential-access memory of the disc type. In this example, a memory medium 1 is spirally deposited on the surface of a nonmagnetic disc 2. In actuality at least one set or plurality of elongated memory mediums 1 arranged side-by-side is deposited on the disc 2. However, only a single storage medium 1 is shown for simple illustration and explanation. An example of the storage medium 1 is composed of, as shown in FIG. 2B by way of example, an elongated ferromagnetic thin film 1*a* deposited on the surface of the substratum (disc) 2, an elongated conductive layer 1*c* deposited on the elongated ferromagnetic thin film 1*a*, and an elongated ferromagnetic thin film 1*b* deposited around the elongated conductive layer 1*c*. In this construction of the storage medium 1, the elongated ferromagnetic thin films 1*a* and 1*b* form a closed magnetic circuit around the conductive layer 1*c* with respect to magnetic fluxes causes by a current flowed in the conductive layer 1*c*. A magnetic head 3 is fixed at the top of an arm 5 connected to a supporter 4 and is disposed closely to the storage medium 1. If the disc 2 is driven by a turntable 10 rotationally in a direction of an arrow $A_1$ and the arm 5 is controlled along directions shown by arrows $A2_a$ and $A2_b$ by a control mechanism (not shown) known per se, the magnetic head 3 scans and magnetizes successively the memory zones of the storage medium 1 in accordance with information signals applied from drive terminals 6. In this case, the magnetic head 3 magnetizes the thin film (1*a* and 1*b*) along the longitudinal direction of the storage medium 1 (i.e.; the hard magnetization direction of the thin film). Circular conductive layers 7*a* and 7*b* are deposited respectively on two sides of the disc near the edge thereof so as to be opposite each other on opposite sides. These circular conductive layers 7*a* and 7*b* contact respectively contactors 8*a* and 8*b* connected to terminals 9. The inner end of the storage medium 1 is connected to the circular conductive layer 7*b* by a connection line deposited at the other surface of the disc 2 as shown by dotted lines.

In operating the memory shown in FIGS. 1 and 2A, the disc 2 is driven by the turntable 10 along the arrow $A_1$ and the arm 5 is controlled so that the magnetic head 3 scans successively the memory zones of the storage medium 1. In storing a bit of binary information into a memory zone of the storage medium 1, a DC drive current is continuously applied to the magnetic head 3 from the drive terminals 6 and an input pulse of plus or minus polarity indicative of the binary information being recorded is applied to the elongated conductive layer 1*c* of the storage medium 1 through the terminals 9, the contactors 8*a* and 8*b* and the circular conductive layers 7*a* and 7*b* at an instant when the magnetic head 3 opposed to the memory zone. In this case, the ferromagnetic thin films of sequential memory zones of the storage medium 1 are successively magnetized by the DC magnetic fluxes generated from the magnetic head 3 in the hard magnetization direction of the ferromagnetic thin film, so that the apparent coercive force Hc of each of the ferromagnetic thin films of the sequential memory zones is reduced due to the anistrophy of the ferromagnetic thin film at the above-mentioned instant. Accordingly, the magnetization state of the memory zone in which the binary information is to be stored is directed to plus or minus polarity along the easy magnetization axis of the ferromagnetic thin film in accordance with the polarity of the input pulse. It will be understood that a plurality of bits of binary information can be stored successively in the memory zones of the storage medium 1 by applying input pulses indicative of the bits of binary information to the terminals 9 while a DC current is continuously applied to the magnetic head 3.

In reading out the stored binary information, the DC current is continuously applied to the magnetic head 3 in driving the disc 2 and the arm 5 as mentioned above so that the directions of magnetizations of the sequential memory zones are successively rotated from the perpendicular direction (easy magnetization direction) of the stored medium 1 to the longitudinal direction (hard magnetization direction) thereof by the DC magnetic fluxes generated from the magnetic head 3. The read out signal is induced in the elongated conductive layer (1*c*) in response to the above-mentioned rotation of magnetization at each of the memory zones and taken out from the terminals 9 through the circular conductive layers 7*a* and 7*b* and the contactors 8*a* and 8*b*. The polarity of the readout signal is determined in accordance with the polarity of the stored binary information. If the intensity of the DC current is predetermined at an appropriate value so that the magnetization direction of a memory zone opposed to the magnetic head 3 is not perfectly rotated to the longitudinal direction of the storage medium 1, nondestructive readout of the stored information is realized. This operation is desirable to reduce the disturbance of the DC drive signal against the adjacent memory zones.

If the binary information is stored in the storage medium 1 in accordance with existence or nonexistence of signals, an alternating current may be employed as the drive current so that alternating readout signals are obtained.

Figure 3:
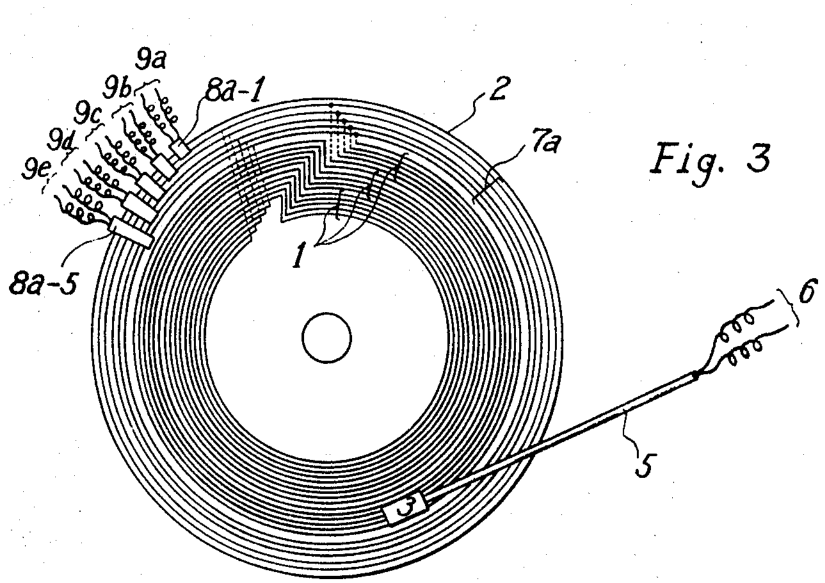
FIG. 3 is a plan view illustrating an embodiment of this invention.

In an actual case, a plurality of storage mediums 1 are provided arranged side-by-side for the magnetic head 3. FIG. 3 shows an actual embodiment of this invention, in which three sets of storage mediums 1 arranged side-by-side are deposited on the disc 2 in an arrangement of concentric circles. In this embodiment, the circular conductive layers 7*a* and 7*b* are each composed of a plurality of concentric circular layers connected to the plural storage mediums 1 respectively. A plurality of contactors 8*a*—1 to 8*a*—5 (and contactors 8*b*—1 to 8*b*—5 not shown) are provided to contact with the concentric circular conductive circular conductive layers 7*a* and 7*b* and to connect with a plurality of terminals 9*a*, 9*b*, 9*c*, 9*d* and 9*e* respectively. One of the storage mediums 1 is employed as a synchronous track for storing a synchronous timing signal. The writing and reading operations in this embodiment are performed in synchronism with the synchronous timing signal readout from the synchronous track. The magnetic head 3 is shifted along a linear line since the storage mediums 1 are arranged in the relationship of concentric circles. The operation of this embodiment can be understood on reference to the operation mentioned above with reference to FIGS. 1, 2A and 2B, so that details are omitted.

Figures 5A, 5B:
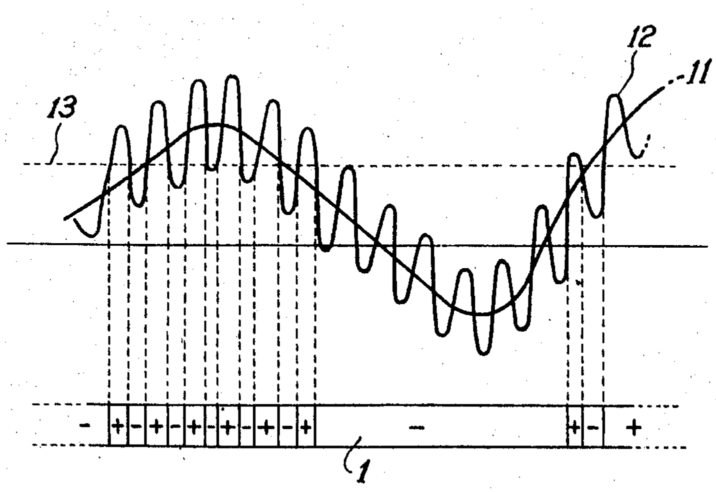
FIGS. 5A and 5B are time charts for describing the operation of this invention.

An analogue signal is storable in the memory of this invention. For this purpose, after the states of all the memory zones of the storage medium 1 are reset to the minus (−) states, a combined signal (FIG. 5A) obtained by superposing a high frequency alternating bias voltage 12 on an analogue signal 11 is applied to the elongated conductive layer (1*c*) of each of the storage medium 1 while a DC current of an appropriate intensity is applied to the magnetic head 3. In this case, the magnetic states of the memory zones at which the instantaneous level of the combined signal exceeds a storable threshold level 13 of each memory zone are reversed to the plus (+) states as shown in FIG. 5B. The stored analogue signal can be regenerated by converting the readout pulses to a rectangular signal having marks and spaces shown in FIG. 5B and by eliminating the component of the high frequency alternating bias voltage 12 from the rectangular signal.

As understood from the above operation, if an alternating signal is applied to the elongated conductive layer 1*c* as the input signal, the length of the memory zone magnetized to a plus or minus polarity is determined in accordance with the half cycle period of the alternating signal. Accordingly, a frequency modulated signal can be stored in the memory of this invention by use of this principle.

Figure 6A:
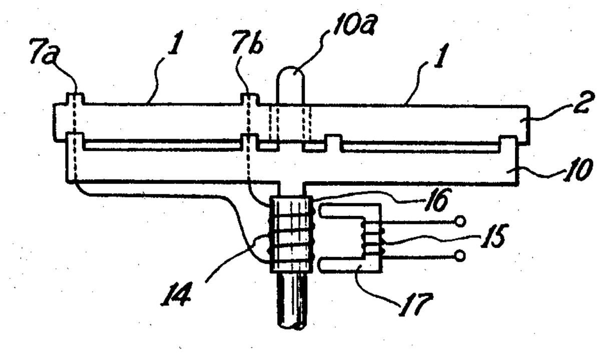
FIGS. 6A and 6B are respectively a side view and a section view for describing other embodiments of this invention.
Figure 6B:
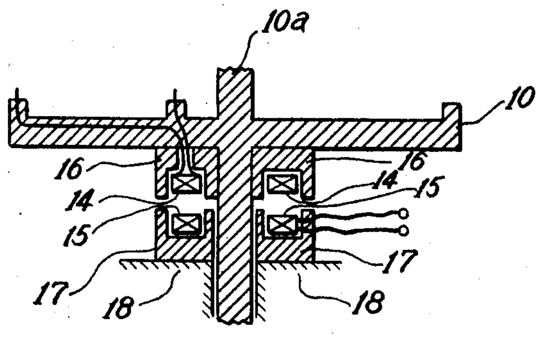

In a case where at least one alternating signal is applied to the elongated conductive layer 1*c* as the input signal, this input signal may be applied through a transformer which comprises a primary winding 15 wound on a fixed core 17 and a secondary winding 14 wound on a rotatable core 16 and connected to two ends 7*a* and 7*b* of the elongated conductive layer 1*c* as shown in FIG. 6A. FIG. 6B shows another example of this case in which the coupling cores 16 and 17 are employed to hold the secondary winding 14 and the primary winding 15 respectively. The core 17 is fixed to a supporting means 18 and the core 16 is rotatable together with the shaft 10*a* of the turntable 10.

Figure 4:
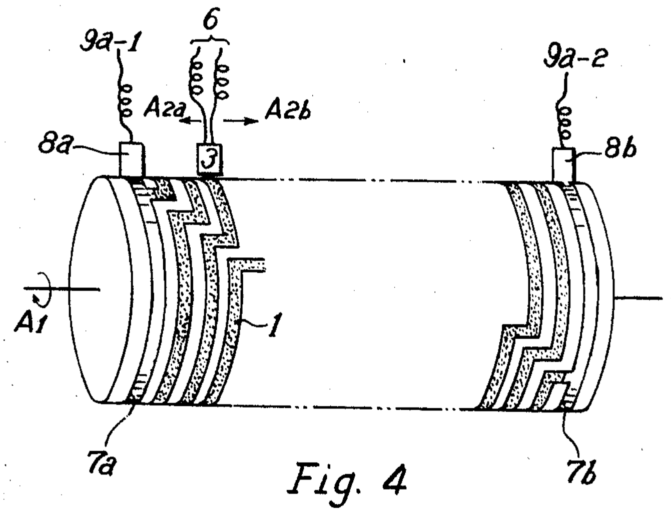
FIG. 4 is a side view of another embodiment of this invention.

In the above details, the memory of magnetic disc type is mainly described. However, this invention may be also applied to form other types of sequential-access memories, such as magnetic drum or magnetic tape. FIG. 4 shows an example of a magnetic drum constituting another embodiment of this invention. In this illustration, a plurality of storage mediums 1 arranged side-by-side, are shown as a single strip 1 for simplifying the illustration. The circular conductive layers 7*a* and 7*b* are provided near the two ends of the drum. Each of the circular conductive layers 7*a* and 7*b* is also composed of a plurality of circular conductive layers each connected to the storage mediums 1. In case of a memory of the magnetic tape-type, the plurality of storage mediums 1 are deposited in parallel on a tape, and the input information signals are applied from the respective two ends of the memory mediums 1 or through a plurality of pairs of contacts provided at both sides of the magnetic head 3 respectively.

What we claim is:

1. A sequential-access memory comprising a nonmagnetic substratum, a set of elongated, electrically conductive information storage layers on said substratum side by side, thin, ferromagnetic film covering each storage layer respectively longitudinally and circumferentially defining a closed magnetic circuit circumferentially of each respective elongated layer, said thin film having an axis of easy magnetization oriented in a direction perpendicular to the longitudinal direction of a respective elongated layer, terminal means to apply electrical readin signals of different polarities successively to the layers corresponding to and representative of information to be stored in said memory, and to read out readout signals from the layers representative of the stored information, and a readin and readout scanning head having means for applying to successive zones of said film covering the elongated conductive layers a DC magnetic field along a hard direction of magnetization of the film during application of the readin signals and applying said magnetic field for deriving the readout signals from said layers.

2. A sequential-access memory according to claim 1, in which said layers are arranged concentrically, and in which said substratum comprises a rotatably driven disc.

3. A sequential-access memory according to claim 1, in which said layers are arranged in a spiral on said substratum, and in which said substratum comprises a rotatably driven disc.

4. A sequential-access memory according to claim 1, in which said head is dimensioned to apply said field to zones of several adjacent storage layers.

5. A sequential-access memory according to claim 1, including means pivotally mounting said substratum for rotation thereof.

6. A sequential-access memory according to claim 1, in which said terminal means comprises contactors making contact with the ferromagnetic film of the conductive layers.

7. A sequential-access memory according to claim 1, in which said terminal means includes at least one transformer for applying the readin signals and reading out the readout signals having a rotary secondary winding electrically connected to a given layer and a primary winding.

8. A sequential-access memory according to claim 1, in which said substratum is a rotatably driven disc, said elongated storage layers being disposed circumferentially about the axis of rotation of said disc, and means pivotally mounting said scanning head for scanning of said storage layers by movement of said head transversely of said storage layers for applying said field to successive zones of said layers as said head scans transversely of said storage layers.

9. A sequential-access memory according to claim 8, in which said, terminal means comprises at least one transformer having a secondary winding connected electrically to a respective conductive storage layer, said secondary winding having coils wound on said pivot means, and a stationary primary winding.

10. A sequential-access memory according to claim 8, in which said means applying said magnetic field comprises means applying said field to a plurality of next adjacent films on next adjacent conductive layers.